United States Patent [19]
Zweig et al.

[11] Patent Number: 5,310,330
[45] Date of Patent: May 10, 1994

[54] SYSTEM FOR MOLDING LAMINATED ARTICLES OF A THERMOPLASTIC RESIN

[75] Inventors: Konrad Zweig, Augsburg; Erwin Bürkle, Bichl; Markus Spötzl, Munich, all of Fed. Rep. of Germany

[73] Assignee: Krauss-Maffei Aktiengesellschaft, Munich, Fed. Rep. of Germany

[21] Appl. No.: 866,993

[22] Filed: Apr. 10, 1992

[30] Foreign Application Priority Data

Apr. 23, 1991 [DE] Fed. Rep. of Germany ....... 4113148

[51] Int. Cl.⁵ .................. B29C 45/02; B29C 45/14; B29C 45/18
[52] U.S. Cl. .................. 425/116; 425/120; 425/561; 425/562; 425/566; 425/DIG. 228
[58] Field of Search .............. 425/116, 120, 558, 560, 425/557, 408, 553, 256, 561, 562, 566, 544, DIG. 228, 129.1; 264/269; 156/245, 500

[56] References Cited

U.S. PATENT DOCUMENTS

| | | | |
|---|---|---|---|
| 3,278,992 | 10/1966 | Strauss | 425/544 |
| 4,071,532 | 1/1978 | Rose | 264/328 |
| 4,611,983 | 9/1986 | Bielfeldt | 425/DIG. 228 |
| 4,923,539 | 5/1990 | Spengler et al. | 156/245 |
| 5,123,833 | 6/1992 | Parker | 425/561 |

FOREIGN PATENT DOCUMENTS

| | | |
|---|---|---|
| 0186015 | 7/1986 | European Pat. Off. . |
| 0331447 | 9/1989 | European Pat. Off. . |
| 865365 | 2/1953 | Fed. Rep. of Germany . |
| 934275 | 10/1955 | Fed. Rep. of Germany . |
| 1729178 | 6/1971 | Fed. Rep. of Germany . |
| 2032174 | 12/1986 | Fed. Rep. of Germany . |
| 2591525 | 12/1985 | France . |
| 59-81144 | 5/1984 | Japan .................. 425/561 |
| 1-85721 | 3/1989 | Japan . |
| 1585554 | 3/1981 | United Kingdom . |
| 2227707 | 8/1990 | United Kingdom . |

*Primary Examiner*—Khanh Nguyen
*Attorney, Agent, or Firm*—Herbert Dubno; Andrew Wilford

[57] ABSTRACT

A resin article is made between an outer concave mold part and an inner convex mold part that can fit together so that respective surfaces form a substantially closed mold cavity. This is done by first lining the surface of the outer mold part with a liner sheet and then fitting the lined outer mold part to the inner mold part to form the substantially closed mold cavity. A portion of the surface of the inner mold part is positioned to form a pocket open inward into the cavity and this pocket is filled with a mass of fluent synthetic resin. The surface portion is then pressed inward while the parts are fitted together and without otherwise relatively moving the mold parts to force the resin mass from the pocket into the cavity until the inner-part surface portion lies substantially flush with the rest of the inner-part surface.

5 Claims, 4 Drawing Sheets

SYSTEM FOR MOLDING LAMINATED ARTICLES OF A THERMOPLASTIC RESIN

FIELD OF THE INVENTION

The present invention relates to a method of and apparatus for molding laminated articles. More particularly this invention concerns making laminated articles of a thermoplastic synthetic resin.

BACKGROUND OF THE INVENTION

A molded article is typically produced in a mold cavity formed between an outer mold part and an inner or core mold part and also in the case of a complexly formed or undercut article by a side part. In a first step the thermoplastic material is filled in fluent condition into the inner mold part, then the outer part is pushed down in it to conform the thermoplastic mass into the desired shape. The outer mold part can be lined with a cover sheet that will form the surface of the finished molded body.

In German patent 865,365 of H. Kattwinkel a molding system is shown where part of the surface of the cavity of the inner mold half is formed by a spring-loaded piston. The plastic mass is pressed into the closed mold cavity to push back this piston and give the finished object the desired end shape.

German patent document 1,729,178 of B. Lohmann describes a system wherein a complicated system of demolding wedges can move at an angle to the molded body to strip it from the mold.

In German patent 3,043,275 of H. Mettenbrink a complexly shaped laminated article is made in a mold having a core that is made of several parts that can be moved relative to each other to allow demolding of the finished article.

German patent document 3,336,080 of F. Bielfeldt describes an injection-molding press for making glass or fiber-reinforced heat-curing bodies which has an injection piston that, in an upper position, blocks a fill passage for the resin. In a lower position the fill passage is unblocked for introducing the resin into the mold.

European patent application A2 186,015 of S. Masui describes a mold for making a laminated body where the mold halves are used to shear off the edges of the liner sheet.

In European patent application A2 331,447 of S. Okubo the liner skin is placed in one mold half and a body of the fill resin on the other half. The fill resin is melted and the two halves are pressed together to produce a laminated article.

British patent document 1,585,554 of O. olabisi two different liquefied resins are fed through a complex piston arrangement to the mold interior. The resultant article is webbed with the two resins intimately integrated with each other.

British patent application 2,227,707 of M. Osada puts a high-density pellet of a meltable synthetic resin in a mold, melts it, then forces it throughout the mold cavity.

All such system are fairly complex and do not allow the simple mass production of parts like a motor-vehicle instrument console which must have one surface formed by an attractive skin but have a body made of a softer resin. The mold must be completely closed around the plastic body before it is compressed, or special edges must be provided in the mold to prevent it from getting between the mating mold surfaces and preventing full closing of the mold.

OBJECTS OF THE INVENTION

It is therefore an object of the present invention to provide an improved system for molding a laminated synthetic-resin article.

Another object is the provision of such an improved system for molding a laminated synthetic-resin article which overcomes the above-given disadvantages, that is which is simple and which produces a smooth and integral article.

SUMMARY OF THE INVENTION

A resin article is made between an outer concave mold part and an inner convex mold part that can fit together so that respective surfaces form a substantially closed mold cavity. This is done according to the invention by first lining the surface of the outer mold part with a liner sheet and then fitting the lined outer mold part to the inner mold part to form the substantially closed mold cavity. A portion of the surface of the inner mold part is positioned to form a pocket open inward into the cavity and this pocket is filled with a mass of fluent synthetic resin. The surface portion is then pressed inward while the parts are fitted together and without otherwise relatively moving the mold parts to force the resin mass from the pocket into the cavity until the inner-part surface portion lies substantially flush with the rest of the inner-part surface.

With the instant invention during flow of the liquefied resin into the mold cavity, the main mold parts do not move at all relative to each other so that the liner sheet will remain perfectly flat, especially if its edges are clamped between the mold parts. It is therefore not necessary to take special precautions to keep the liner smooth and tight during the molding operation.

When the inner part projects into and is undercut by the outer part, the liner sheet is deformed to fit it over the inner part and line the outer part with it. This makes it possible to mold even severely undercut parts. The liner in this case can be a molded element itself.

The mold according to the invention comprises a piston in the inner mold part forming the wall portion thereof and movable between a retracted position forming the pocket and an extended position flush with the rest of the inner-part surface. The inner part and the piston are formed with respective feed passages that communicate with each other in the retracted position and that do not communicate with each other in the extended position. Thus the piston itself acts as a feed-control valve.

According to another feature of this invention the inner mold part has several such pocket-forming movable wall portions. They serve to make an elongated lined object. The inner part is elongated and the pocket can be formed as a longitudinally elongated slot or as a plurality of such movable wall portions longitudinally spaced apart.

It is also possible for the actuating/operating system to include a double-acting piston-and-cylinder unit in the inner mold part connected to the wall portion thereof for moving the wall portion between a retracted position forming the pocket and an extended position flush with the rest of the inner-part surface.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
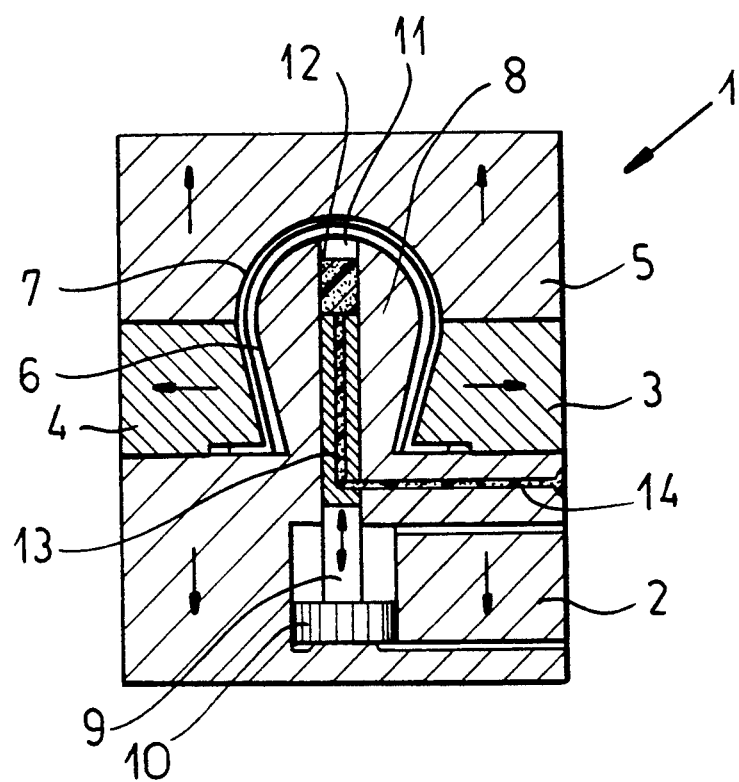
FIG. 1 is a vertical section through a mold according to the invention.

As seen in FIG. 1 a mold 1 comprises a bottom core or inner part 2 having a plug 8, a top or outer part 5, and here a pair of side parts 3 and 4 as the plug 8 is undercut. The plug 8 forms with the inner surfaces of the parts 3, 4, and 5 a closed cavity 6 that is here shown to be lined on the inner surfaces of the parts 3 through 5 with a liner foil 7, for instance a molded cup-shaped piece of imitation leather.

According to the invention the inner part 2 is provided with a movable piston 9 that is carried on a double-acting piston-and-cylinder unit 10 and that can form a pocket 11 that opens at the top of the plug 8. A passage 13 in the piston 9 can align with a feed passage 14 in the part 2 in the illustrated retracted position of the piston 9 to allow a mass 12 of a liquefied filler resin to be injected into the pocket 11.

Figure 2:
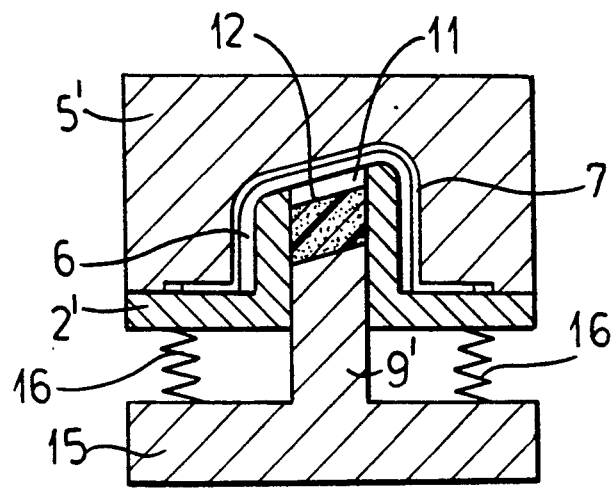
FIGS. 2 through 4 are partly diagrammatic vertical sections through another mold showing successive steps of its operation.
Figure 3:
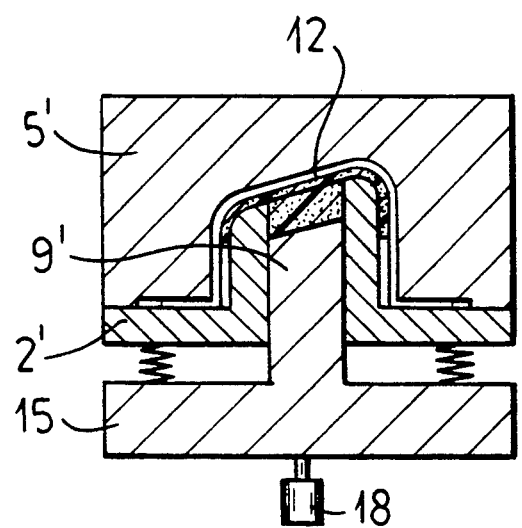
Figure 4:
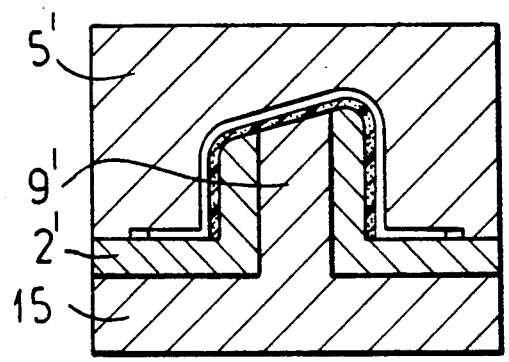

FIGS. 2 through 4 show a similar system where the inner part 2' is not undercut and where the piston 9' is carried on a base plate 15 that bears via springs 16 on the bottom of the part 2' to press it up against the part 5'. In use to start with the two parts 2' and 5' are pressed together to clamp an outer edge of the liner 7 between them and to set the cavity 6 at its final volume. In this position the piston 9' is retracted to form the pocket 11 that is filled almost to the top with a mass 12 of liquefied resin.

Then as shown in FIG. 3 the base plate 15 is pushed by an actuator illustrated schematically at 18 to force the mass 12 out into the cavity 6 against the inner surface of the liner 7. When the plate 15 bottoms on the part 2' as shown in FIG. 4 the mass 12 has completely filled the cavity 6, pressing the liner 7 tightly against the concave inner surface of the part 5'.

Figure 5:
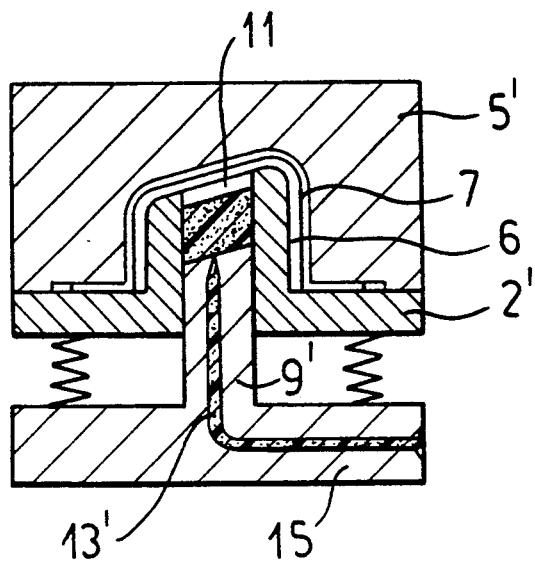
FIGS. 5 and 6 are vertical sections through further molds in accordance with this invention.

The arrangement of FIG. 5 is substantially identical to that of FIGS. 2 through 4 except that the base plate 15 and piston 9' are formed with a feed passage 13' for introducing the mass 12 into the pocket 11.

Figure 6:
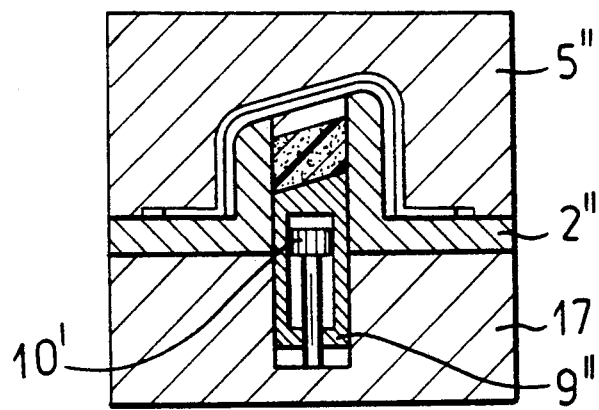

In FIG. 6 the lower part 2'' is fixed to a base plate 17 that incorporates a slidable piston 9'' that can be moved up and down by a double-acting piston 10'.

Figure 7:
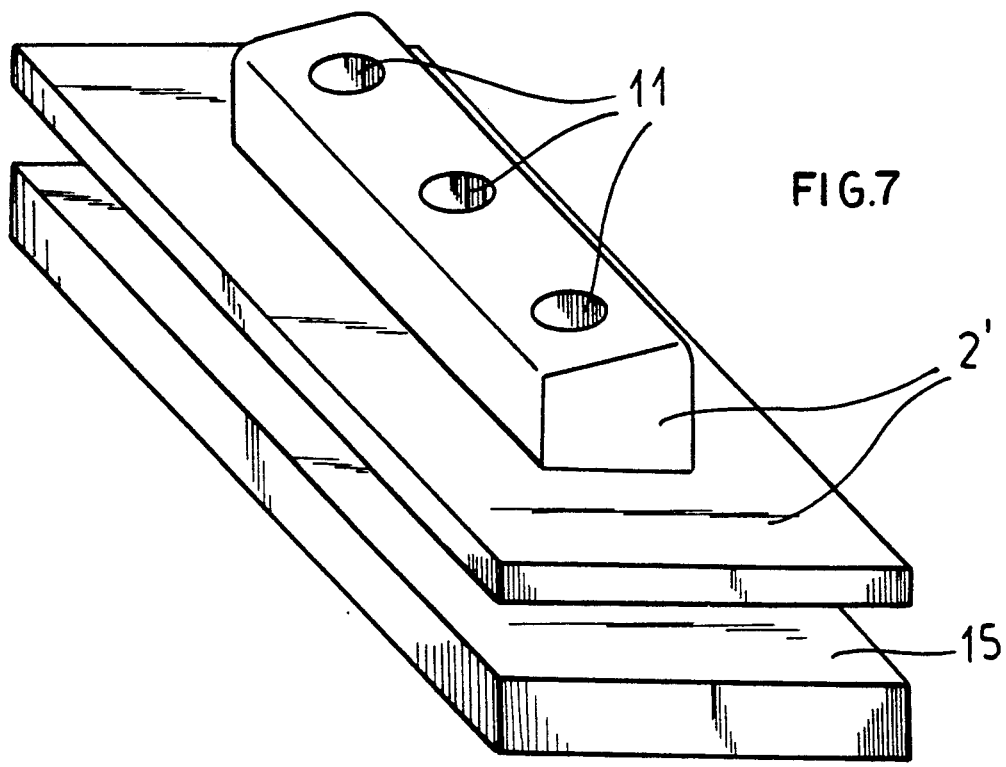
FIGS. 7 and 8 are perspective views of further molds according to the invention.
Figure 8:
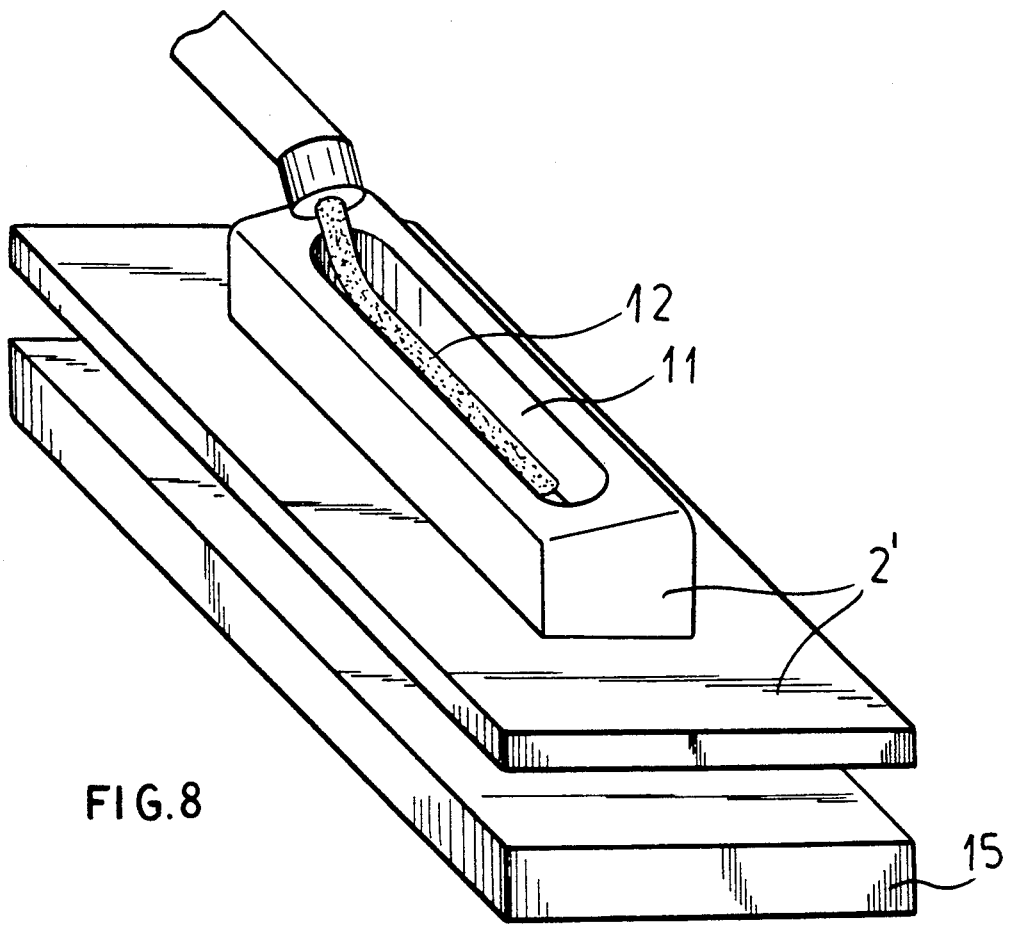

The system of FIG. 7 is used for making an elongated laminated molded article and has an upper part 2' formed with three such pockets 11 of cylindrical shape. In FIG. 8 the same elongated system is used, but with an elongated slot-shaped pocket 11.

We claim:

1. An apparatus for molding a laminated resin article, the apparatus comprising:
   an outer mold part having a concave inner surface;
   an inner convex mold part having an inner convex surface and fittable with the outer part such that the inner-part and outer-part surfaces together form a substantially closed mold cavity;
   a piston set in the inner mold part and having an end surface, the piston being movable between a retracted position with its end surface withdrawn from the inner-part surface and forming a pocket open inward into the cavity and an extended position with the end surface flush with and forming a smooth continuation of the inner-part surface, the inner part and the piston being formed with respective feed passages that communicate with each other only in the retracted position and that do not communicate with each other in the extended position, the feed passage of the piston opening at the end surface thereof; and
   operating means for
      holding a liner in the cavity generally against the concave outer-part surface, and
      fitting the outer mold part holding the liner to the inner mold part to form the substantially closed mold cavity;
      positioning the piston to form with its end surface the pocket open inward into the cavity;
      filling the pocket with a mass of fluent synthetic resin; and
      inwardly pressing the piston of the inner mold part from the retracted position into the extended position while the inner and outer mold parts are fitted together and without otherwise relatively moving the mold parts to force the resin mass from the pocket into the cavity until the end surface of the piston lies substantially flush with the inner-part surface to press the liner tightly against the outer-part surface and to misalign the feed passages to prevent the resin from flowing out of the cavity therethrough.

2. The molding apparatus defined in claim 1 wherein the inner mold part has a plurality of such pocket-forming movable pistons.

3. The molding apparatus defined in claim 1 wherein the operating means includes a double-acting piston-and-cylinder unit in the inner mold part connected to the piston for moving the piston between the retracted position forming the pocket and the extended position flush with the inner-part surface.

4. The molding apparatus defined in claim 1 wherein the inner part is elongated an the pocket is a longitudinally elongated slot.

5. The molding apparatus defined in claim 1 wherein the inner part is elongated and has a plurality of such pistons longitudinally spaced apart.

* * * * *